April 25, 1944.       R. A. FORESMAN        2,347,549
MATERIAL HANDLING APPARATUS
Filed Dec. 10, 1941        2 Sheets-Sheet 1

WITNESSES:

INVENTOR
ROBERT A. FORESMAN.
BY
ATTORNEY

April 25, 1944. R. A. FORESMAN 2,347,549
MATERIAL HANDLING APPARATUS
Filed Dec. 10, 1941 2 Sheets-Sheet 2
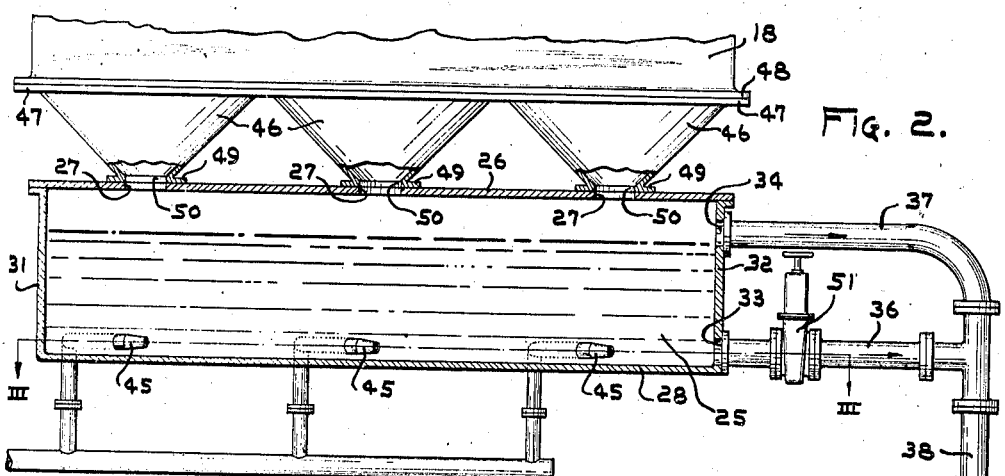
FIG. 2.
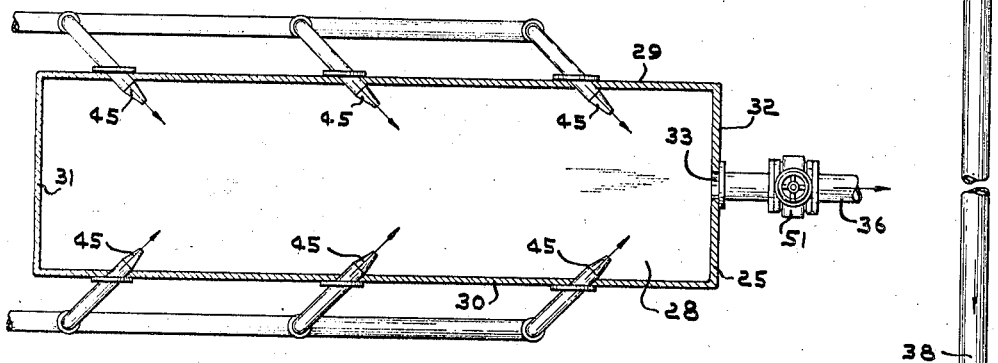
FIG. 3.
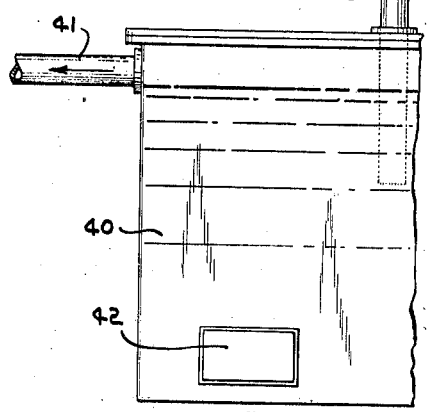
WITNESSES:
INVENTOR
ROBERT A. FORESMAN.
BY
ATTORNEY Patented Apr. 25, 1944

2,347,549

UNITED STATES PATENT OFFICE 2,347,549

MATERIAL-HANDLING APPARATUS

Robert A. Foresman, Prospect Park, Pa., assignor to Westinghouse Electric & Manufacturing Company, East Pittsburgh, Pa., a corporation of Pennsylvania Application December 10, 1941, Serial No. 422,413

2 Claims. (Cl. 302—15)

The present invention relates to material-handling apparatus, more particularly to hydraulic conveyors for the solid products of combustion from furnaces, and it has for an object the provision of improved apparatus of this character.

With pulverized fuel fired furnaces, the disposition of the fly ash removed from the flue gases constitutes a major problem. In large central station installations the amount of fly ash removed from the furnace gases during a twenty-four hour period may equal 200 tons, or more.

This problem is particularly difficult with that type of pulverized fuel fired combustion apparatus where the mechanism for removing the fly ash from the flue gases is located above the boiler. In many installations, the boiler is 75 feet or more in height and the fly ash precipitator or separator is frequently located above the top of the boiler. In such cases, the space between the precipitator and the top of the boiler available for ash removal mechanism is very limited, as any increase in the height of this space necessitates a corresponding increase in the height of the power plant, and at such heights any such increase would be relatively very expensive.

Heretofore, it has been believed that fly ash could not be removed and transported from this location successfully by hydraulic means, and as a result, in actual practice, fly ash has been collected dry and transported in that state to a hopper outside of the plant. Generally, pneumatic means have been relied upon in such removal of fly ash from the separator to the externally-located hopper. The use of pneumatic conveying means in such installations produces an undesired result in that there is generally considerable leakage of air from the conveying system to the separator, thereby reducing the efficiency of the induced draft fan tending to create a vacuum or sub-atmospheric pressure in the separator and connecting ducts.

The present invention contemplates the elimination of these and other difficulties by the provision of novel hydraulic material-transporting mechanism. Therefore, another object of the invention is the provision of a closed hydraulic material-conveying system.

A further object of the invention is to provide a closed and sealed hydraulic system for conveying fly ash from a point, in the flow path of gases through combustion apparatus, where the pressure is below atmospheric to a place of discharge which is at atmospheric pressure.

These and other objects are effected by the invention as will be apparent from the specification taken in accordance with the accompanying drawings, forming a part of this application, in which:

Fig. 2 is an enlarged detail view of a portion of the apparatus shown in Fig. 1; and Fig. 3 is a sectional view taken along the line III—III of Fig. 2 looking in the direction of the arrows.

Figure 1:
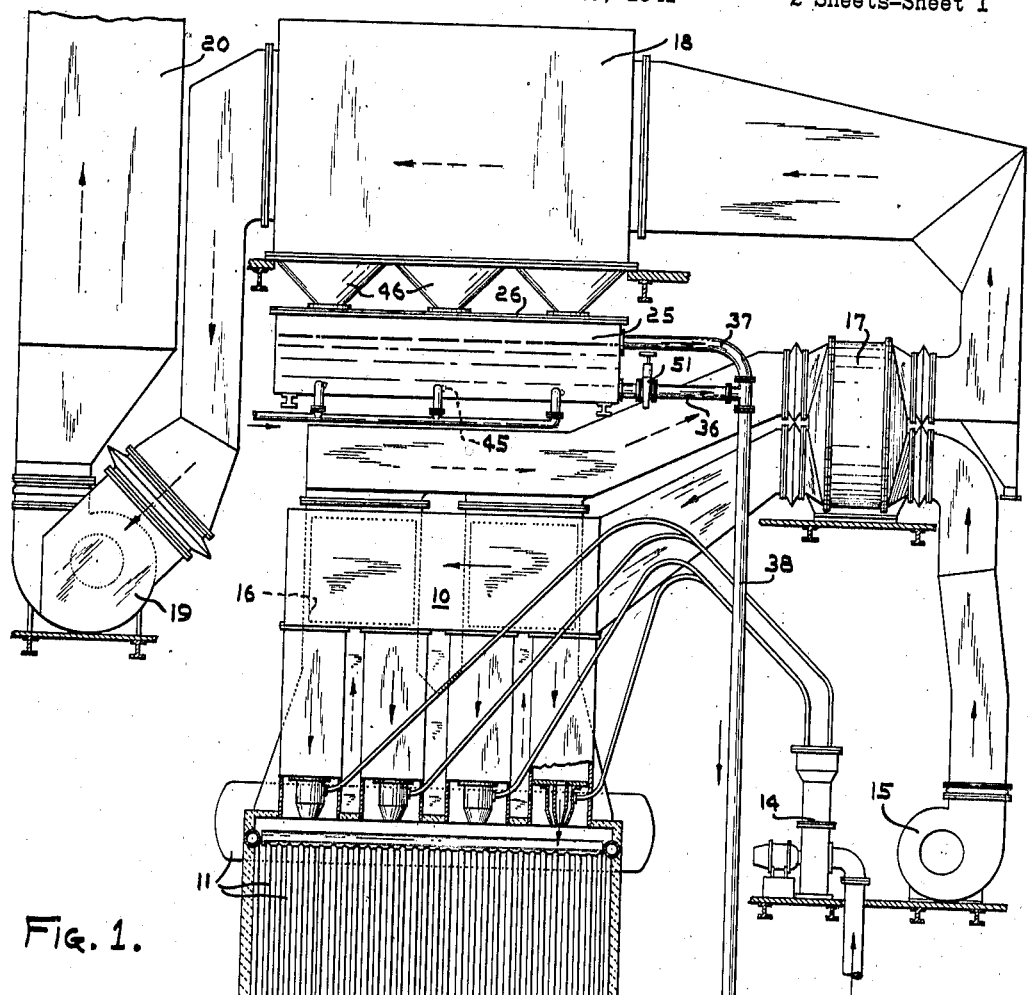
Fig. 1 is a side elevational view of combustion apparatus, with portions thereof broken away for the sake of clearness.
Figure 1:
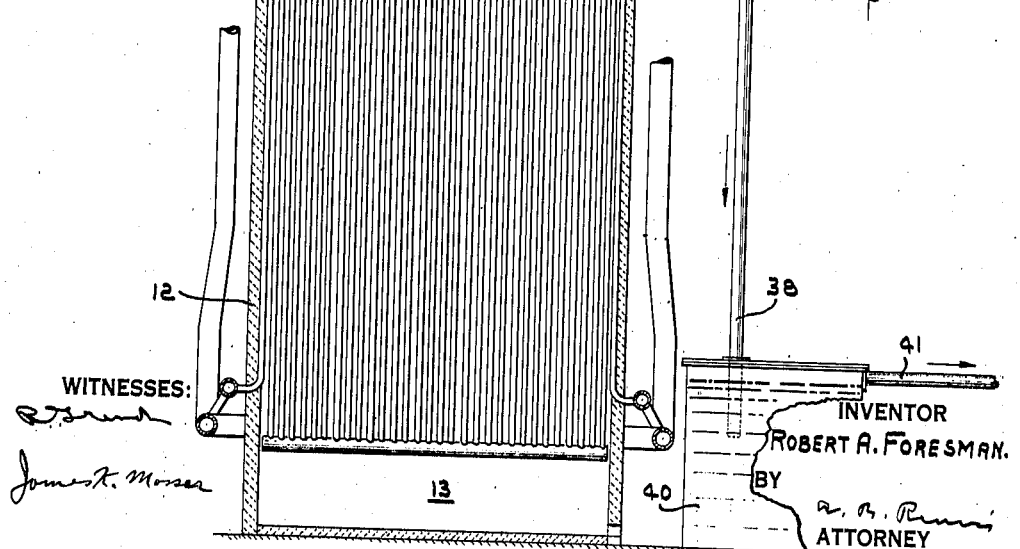

Referring now to the drawings more in detail, there is shown at 10, in Fig. 1, a combustion apparatus installation which may be considered conventional insofar as the boiler 11, furnace 12, slag pit 13, pulverized fuel feeding mechanism 14, forced draft fan 15, economizer 16, preheater 17, precipitator 18, induced draft fan 19, and stack 20 are concerned.

There is provided, in the limited space between the separator 18 and the top of the boiler, a mixing tank 25 comprised by a top wall 26 having a plurality of inlet openings 27 therein, a bottom wall 28, side walls 29 and 30 and end walls 31 and 32, the wall 32 having an outlet opening 33 near its lower edge and an overflow opening 34 near its upper edge.

A pair of branch conduits 36 and 37 provide for communication between the openings 33 and 34, respectively, and a common discharge conduit 38 extending from the vicinity of the mixing tank to an energy dissipating tank 40. Preferably, this latter tank 40 is located at or near the basement level of the plant containing the combustion apparatus, and is provided with an overflow connection to a main refuse discharge line 41 which extends from the tank 40 to a place of final discharge, generally located externally of the plant. Preferably, the tank 40 is provided with one or more clean-out openings 42 near the bottom thereof to permit of convenient removal from the tank of any accumulations of refuse therein.

For reasons to be pointed out later, it is important that the lower end of the refuse conduit 38 extend a material distance below the level of the body of liquid maintained within the tank 40, which level is determined by the overflow connection to the conduit 41.

A plurality of nozzles 45 are positioned with their discharge portions extending through the side walls 29 and 30 of the mixing tank 25, and preferably at such an angle to the perpendicular of the tank sides that jets of liquid provided thereby are directed at least partially longitudinally of the tank in the general direction of the outlet openings 33 and 34 in the end wall 32.

The top wall 26 of the mixing tank 25 is positioned a material distance below the lowermost portion of the separator or precipitator 18 to provide space for a plurality of hoppers 46 which are provided at their upper edges with flanges 47 adapted to cooperate with and be secured to corresponding flanges 48 at the lower edge of the separator 18. In like manner, the hoppers are provided at their lower edges with flanges 49 cooperating with and secured to the top wall 26 of the mixing tank. The hoppers 46 are provided with discharge openings 50 aligned with the inlet openings 27 in the top wall of the mixing tank with the result that the hoppers serve to direct all fly ash precipitated out of the flue gases by the precipitator 18 into the mixing tank 25.

It will be apparent to those skilled in the art that this apparatus is capable of operation either intermittently or continuously, depending upon operating conditions within the particular plant. If the apparatus is to be operated intermittently the valve 51 which controls the branch conduit 36 and the lower outlet opening 33 will be normally closed and sufficient water or other liquid will be supplied to the tank 25 to fill the same to the level determined by the overflow opening 34, at which time the supply of water to the tank will be interrupted. When the quantity of fly ash or other solid particles of combustion removed from the flue gases by the separator or precipitator 18 and directed to the tank by the hoppers 46 has reached the desired amount the valve 51 will be opened and water supplied to the tank through the nozzles 45, the jets of water serving to agitate and maintain fluent the mixture of solid matter and water within the tank and also serving to assist in discharge thereof through the opening 33 and associated conduits 36 and 38 to the energy-dissipating tank 40 and thence to the main refuse discharge line 41.

It will be apparent that where the mixing tank 25 is located above or near the top of the boiler there may be a drop of 75 to 100 feet or more from the mixing tank 25 to the energy-dissipating tank 40, and if the latter tank were not present the kinetic energy present in the gravitational discharge of the mixture through the conduit 38 would result in early erosion and destruction of any joint or bend providing for change of direction of flow of the mixture from the vertical conduit 38 to the horizontal main discharge conduit 41.

Inasmuch as the induced draft fan 19 normally maintains a sub-atmospheric pressure in the separator 18, it is desirable to prevent leakage of air or gases through the conduit 38 or the mixing tank 25 to the separator 18 and, to this end, the terminal portion of the conduit 38 is maintained submerged in the liquid in the tank 40. In addition, the tank 25 is constructed in a gastight manner and gastight connections are provided between the hopper 46 and the tank 25 as well as between the hoppers and the separator.

While in the construction herein illustrated the hoppers 46 are joined to the separator 18 by meeting flanges providing a gastight connection, the two parts may be structurally independent, and leakage of gas therebetween prevented by use of a conventional water seal wherein a dependent skirt or flange on the separator extends below the surface of water maintained in grooves or channels at the upper edges of the hoppers 46.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What is claimed is:

1. Material-handling apparatus comprising a hopper for reception of dry material in a finely-divided state; a mixing tank beneath said hopper and comprising a top wall having an inlet opening therein providing for flow of dry material from the hopper to the tank, a bottom wall and side walls, and said tank having a discharge opening in the lower portion thereof and a second discharge opening in the upper portion thereof spaced below the top wall; a main discharge conduit having a pair of branches at its upper end communicating with said discharge openings; valve means controlling the branch communicating with the first discharge opening; means for normally maintaining a body of water within the tank with its upper level maintained by overflow of water through the second discharge opening and including a plurality of water jets disposed within the tank and adapted to direct a stream of water under pressure against the material therein so as to agitate and maintain fluent the mixture and to move such mixture through the first discharge opening when the valve opens the conduit branch therefrom.

2. Material-handling apparatus comprising a hopper for reception of dry material in a finely-divided state; a mixing tank disposed to receive dry material from said hopper and comprising bottom and side walls, said tank having a first discharge opening in the lower portion thereof and a second discharge opening in the upper portion thereof; a main discharge conduit having a pair of branches at its upper end communicating with said discharge openings; valve means controlling the branch communicating with the first discharge opening; means for normally maintaining a body of liquid within the tank with its maximum level maintained by overflow of liquid through the second discharge opening and including a plurality of nozzles adapted to direct streams of liquid against material within the tank so as to agitate and maintain fluent the mixture of material and liquid and to move such mixture through the first discharge opening when the valve opens the conduit branch therefrom.

ROBERT A. FORESMAN.